United States Patent
Dominic

(10) Patent No.: US 10,220,700 B2
(45) Date of Patent: Mar. 5, 2019

(54) PROTECTION AND SUPPORT FOR VEHICLE ENGINE COMPONENTS

(71) Applicant: Toyota Motor Engineering & Manufacturing North America, Inc., Erlanger, KY (US)

(72) Inventor: Justin E. Dominic, Milan, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 343 days.

(21) Appl. No.: 14/616,848

(22) Filed: Feb. 9, 2015

(65) Prior Publication Data

US 2016/0230655 A1 Aug. 11, 2016

(51) Int. Cl.
| | |
|---|---|
| *F02B 67/10* | (2006.01) |
| *F02D 9/02* | (2006.01) |
| *F02M 35/10* | (2006.01) |
| *F02M 37/00* | (2006.01) |
| *B60K 15/01* | (2006.01) |
| *F02B 75/22* | (2006.01) |
| *F02B 77/08* | (2006.01) |

(52) U.S. Cl.
CPC .............. *B60K 15/01* (2013.01); *F02B 75/22* (2013.01); *F02B 77/08* (2013.01); *F02M 35/10078* (2013.01); *F02M 35/10085* (2013.01); *F02M 37/007* (2013.01); *F02D 2009/0206* (2013.01); *F02M 2200/185* (2013.01)

(58) Field of Classification Search
CPC ....... F02M 35/10078; F02M 35/10085; F02M 37/007; F02M 2200/185; F02D 2009/0206; F02B 75/22; F02B 77/08; B60K 15/01

USPC ..... 123/195 A, 195 C, 195 R, 198 D, 198 E, 123/456, 468, 469, 184.21, 184.31, 54.4, 123/184.34, 184.35
See application file for complete search history.

(56) References Cited

U.S. PATENT DOCUMENTS

| | | | | |
|---|---|---|---|---|
| 4,872,424 A | * | 10/1989 | Carnes ............. | F02M 35/10039 123/184.32 |
| 5,003,933 A | * | 4/1991 | Rush, II ............. | F02B 27/0263 123/184.42 |
| 5,094,194 A | * | 3/1992 | Rush, II ............. | F02B 27/00 123/184.42 |

(Continued)

FOREIGN PATENT DOCUMENTS

| | | |
|---|---|---|
| EP | 1614887 B1 | 11/2006 |
| EP | 1582736 B1 | 8/2008 |

(Continued)

*Primary Examiner* — John Zaleskas
(74) *Attorney, Agent, or Firm* — Christopher G. Darrow; Darrow Mustafa PC

(57) ABSTRACT

Vehicle engine systems and protectors for such systems are presented. Vehicle engine systems can include one or more engine components associated with an engine. In some embodiments a protector can be attached to an engine system to substantially cover a portion of one or more engine components. The protector can have a shield and a support. In some arrangements, the shield can be operatively connected to two cylinder banks of an engine. The shield can extend over and substantially cover a portion of a fuel line and/or a fuel line connector. In one or more embodiments, the support can include a support end configured to support a vehicle component such as a throttle body.

14 Claims, 3 Drawing Sheets

(56) References Cited

U.S. PATENT DOCUMENTS

| | | | | |
|---|---|---|---|---|
| 5,261,375 A * | 11/1993 | Rush, II | .................. | F02B 27/00 |
| | | | | 123/456 |
| 5,713,323 A * | 2/1998 | Walsh | .................... | F02B 27/00 |
| | | | | 123/184.42 |
| 5,887,560 A * | 3/1999 | Kobayashi | .............. | F02F 7/006 |
| | | | | 123/184.21 |
| 5,911,205 A * | 6/1999 | Gambardella | .......... | F02B 27/00 |
| | | | | 123/184.35 |
| 5,927,254 A * | 7/1999 | Ino | ........................... | F01P 1/10 |
| | | | | 123/184.61 |
| 6,167,855 B1 * | 1/2001 | Mammarella | ........... | F02F 7/006 |
| | | | | 123/184.21 |
| 6,394,071 B2 * | 5/2002 | Nitta | ....................... | F02F 7/006 |
| | | | | 123/456 |
| 6,497,245 B1 * | 12/2002 | Torii | ........................ | F02D 9/10 |
| | | | | 123/337 |
| 6,776,132 B2 * | 8/2004 | Kudo | .............. | F02M 35/10111 |
| | | | | 123/184.42 |
| 6,817,337 B1 * | 11/2004 | Siring | .............. | F02M 35/10144 |
| | | | | 123/195 A |
| 6,868,818 B2 * | 3/2005 | Takahashi | ............... | F01L 1/053 |
| | | | | 123/195 A |
| 6,990,959 B1 * | 1/2006 | Zdroik | ................ | F02M 69/462 |
| | | | | 123/184.31 |
| 7,128,056 B2 * | 10/2006 | Kondo | ................ | F02M 61/145 |
| | | | | 123/470 |
| 7,392,782 B2 | 7/2008 | Fujii | | |
| 7,451,732 B1 * | 11/2008 | Vichinsky | ............ | F02M 25/089 |
| | | | | 123/184.42 |
| 7,784,580 B2 * | 8/2010 | Takahata | .............. | F02M 59/102 |
| | | | | 180/274 |
| 7,810,466 B2 * | 10/2010 | Preimesberger | ........ | F02B 67/10 |
| | | | | 123/184.31 |
| 7,878,174 B2 * | 2/2011 | Nishimura | ......... | F02M 37/0017 |
| | | | | 123/336 |
| 8,028,673 B2 * | 10/2011 | Olsen | ...................... | F02B 77/00 |
| | | | | 123/198 D |
| 8,061,332 B1 * | 11/2011 | Harbert | ................. | F02M 51/005 |
| | | | | 123/195 C |
| 2004/0159302 A1 * | 8/2004 | Horibe | ............ | F02M 35/10078 |
| | | | | 123/195 C |
| 2005/0045155 A1 * | 3/2005 | Harvey | ............ | F02M 35/10085 |
| | | | | 123/470 |
| 2006/0005800 A1 * | 1/2006 | Fujii | ................ | F02M 35/10144 |
| | | | | 123/195 C |
| 2006/0042601 A1 * | 3/2006 | Hotta | ...................... | F02B 31/04 |
| | | | | 123/468 |
| 2006/0090722 A1 * | 5/2006 | Boveia | ............ | F02M 35/10052 |
| | | | | 123/184.21 |
| 2007/0012501 A1 * | 1/2007 | Frank | ..................... | B60K 15/01 |
| | | | | 180/232 |
| 2009/0133657 A1 * | 5/2009 | Fornara | ........... | F02M 35/10216 |
| | | | | 123/184.21 |
| 2010/0242916 A1 * | 9/2010 | Hunt | .................... | F02M 55/025 |
| | | | | 123/469 |
| 2012/0125284 A1 * | 5/2012 | Brace | ..................... | B62K 11/04 |
| | | | | 123/195 R |
| 2012/0167860 A1 * | 7/2012 | Wong | .................. | F02B 29/0462 |
| | | | | 123/542 |
| 2014/0123951 A1 * | 5/2014 | Imakita | ................ | F02M 55/025 |
| | | | | 123/469 |
| 2016/0341159 A1 * | 11/2016 | Dominic | ............ | F02M 35/104 |
| 2016/0341160 A1 * | 11/2016 | Dominic | ............ | F02M 35/1034 |

FOREIGN PATENT DOCUMENTS

| | | | | | |
|---|---|---|---|---|---|
| EP | 2397356 A1 | * | 12/2011 | ............. | B66C 1/107 |
| JP | 06050225 A | * | 2/1994 | ............. | F02B 75/22 |
| JP | 06248967 A | * | 9/1994 | ............. | F02B 75/22 |
| JP | 07332196 A | * | 12/1995 | | |
| JP | 2001193601 A | * | 7/2001 | | |
| JP | 2001317436 A | * | 11/2001 | | |
| JP | 2003172202 A | * | 6/2003 | | |
| JP | 2004169637 A | * | 6/2004 | | |
| JP | 2004360581 A | * | 12/2004 | ............ | F02M 39/02 |
| JP | 2005113818 A | * | 4/2005 | | |
| JP | 2006322376 A | * | 11/2006 | | |
| JP | 2007016716 A | * | 1/2007 | ............ | F02M 39/02 |
| JP | 2009138646 A | * | 6/2009 | | |
| JP | 2012137025 A | * | 7/2012 | | |
| WO | WO 2009139081 A1 | * | 11/2009 | ........... | F02M 69/044 |

* cited by examiner

PROTECTION AND SUPPORT FOR VEHICLE ENGINE COMPONENTS

FIELD

The present disclosure relates in general to vehicle engine components, and more particularly, to the protection and support of vehicle engine components.

BACKGROUND

Modern vehicles, such as passenger and commercial vehicles, have various components and systems associated with vehicle engine systems. Examples of such components and systems can include fluid, electrical, and mechanical inputs to an engine. Vehicle engine systems can include several structures that support, attach, protect, shield, locate, or position different components within the system.

For instance, referring to FIG. 1, a portion of a known bracket system is shown. The bracket system includes a first bracket 150 and a second bracket 160. Both the first bracket 150 and the second bracket 160 are attached to a cylinder head 110 of engine 100. First bracket 150 is attached to the cylinder head 110 via two fastener bolts 152. Second bracket 160 is attached to cylinder head 110 via one fastener bolt 168. The second bracket 160 includes a first end 162 located near the attachment to the engine 100 and a second end 164 spaced apart from the first end 162. The second end 164 includes a slot 166 to receive a portion of, and support, a vehicle component near engine 100.

Under certain impact conditions, the second bracket 160 can be displaced, deformed, or otherwise moved relative to the first bracket 150. For example, the second bracket 160 can be displaced in a direction of arrow A past a portion of the first bracket 150. This relative movement between the second bracket 160 and the first bracket 150 can cause the second bracket 160 to contact or damage one or more engine components in the area.

SUMMARY

In one respect, the present disclosure is directed to a protector for a vehicle engine system. The protector can include a shield having a first mounting tab and a second mounting tab, wherein the first mounting tab is configured to be operatively connected to a first cylinder bank of an engine and the second mounting tab is configured to be operatively connected to a second cylinder bank of the engine. The shield can form an arched portion configured to substantially cover an engine fuel delivery component. The protector can include a support operatively connected with the shield. The support can have a support end with a slot, and the slot can be configured to support an engine air intake component.

In another respect, the present disclosure is directed to a protector for an engine component. The protector can include a shield configured to substantially cover the engine component, and the shield can include a plurality of mounting tabs. The protector can include a support operatively connected to the shield, and the support can have a support end configured to support a vehicle component.

In yet another respect, the present disclosure is directed to a vehicle engine system. The vehicle engine system can include an engine having a first cylinder bank and a second cylinder bank, a fuel line, a fuel connector in fluid communication with the fuel line and the engine, a throttle body, and a protector. The protector can include a shield having a first mounting tab and a second mounting tab, wherein the first mounting tab is configured to be operatively connected to the first cylinder bank and the second mounting tab is configured to be operatively connected to the second cylinder bank. The shield can form an arched portion configured to substantially cover a portion of the fuel line or the fuel connector. The protector can include a support operatively connected with the shield, and the support can have a support end with a slot. The slot can be configured to support the throttle body.

Variations in these and other aspects, features, elements, implementations, and embodiments of the methods, systems, and apparatuses are disclosed herein are described in further detail hereafter.

DETAILED DESCRIPTION

Figure 1:
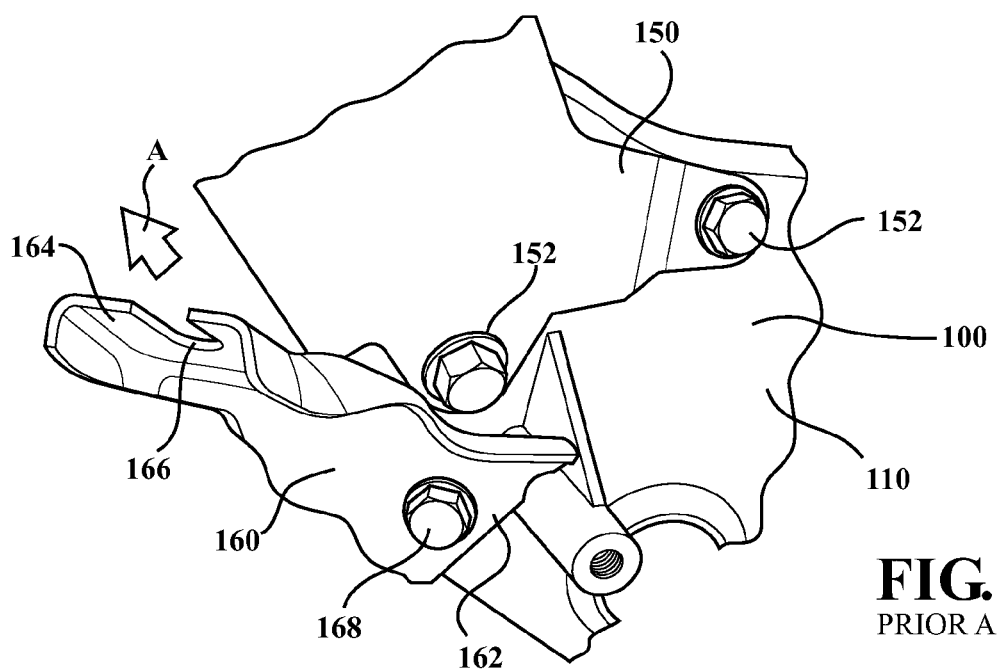
FIG. 1 is a view of a prior art bracket system.

Arrangements described herein relate to the protection of components within a vehicle engine system. In one or more arrangements, the vehicle engine system can include a protector. The protector can be configured to protect a portion of one or more of components of the vehicle engine system. The protector can include a shield that is configured to substantially cover a portion of a component. The protector can also include a support to allow one or more additional components to be attached, supported, and/or located within the engine system. The support can be operatively connected to the shield such that the support minimizes relative movement between the shield and/or engine components during impact.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 2-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 2:
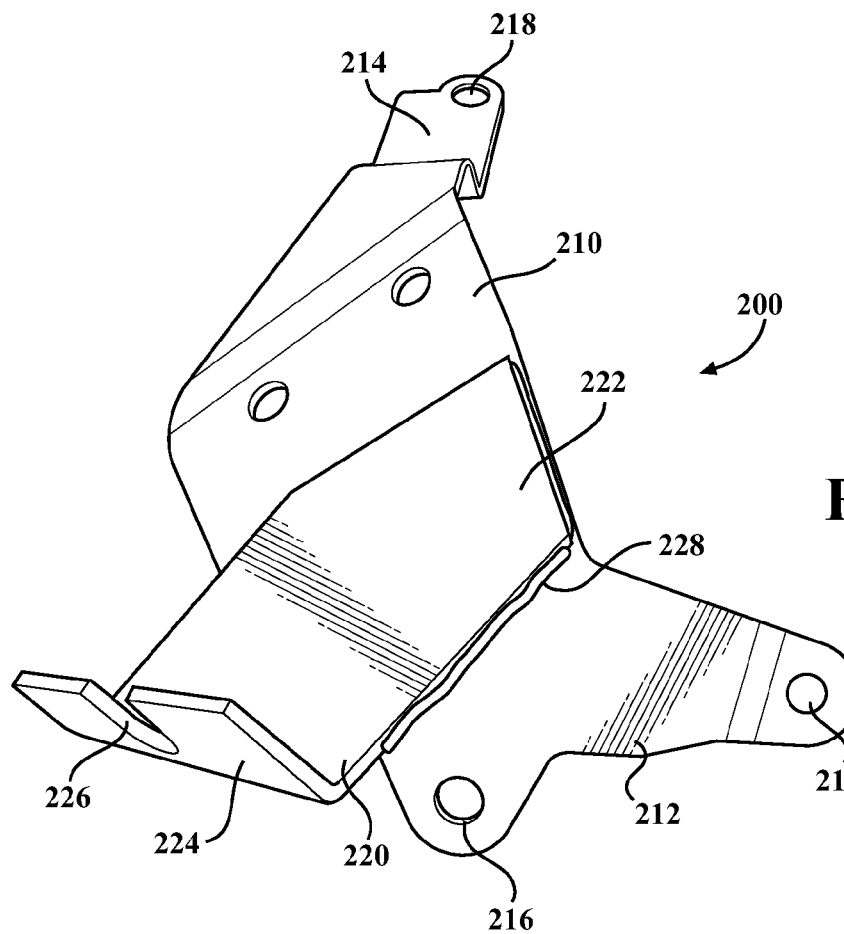
FIG. 2 is a view of an example of a protector for an engine component.
Figure 3:
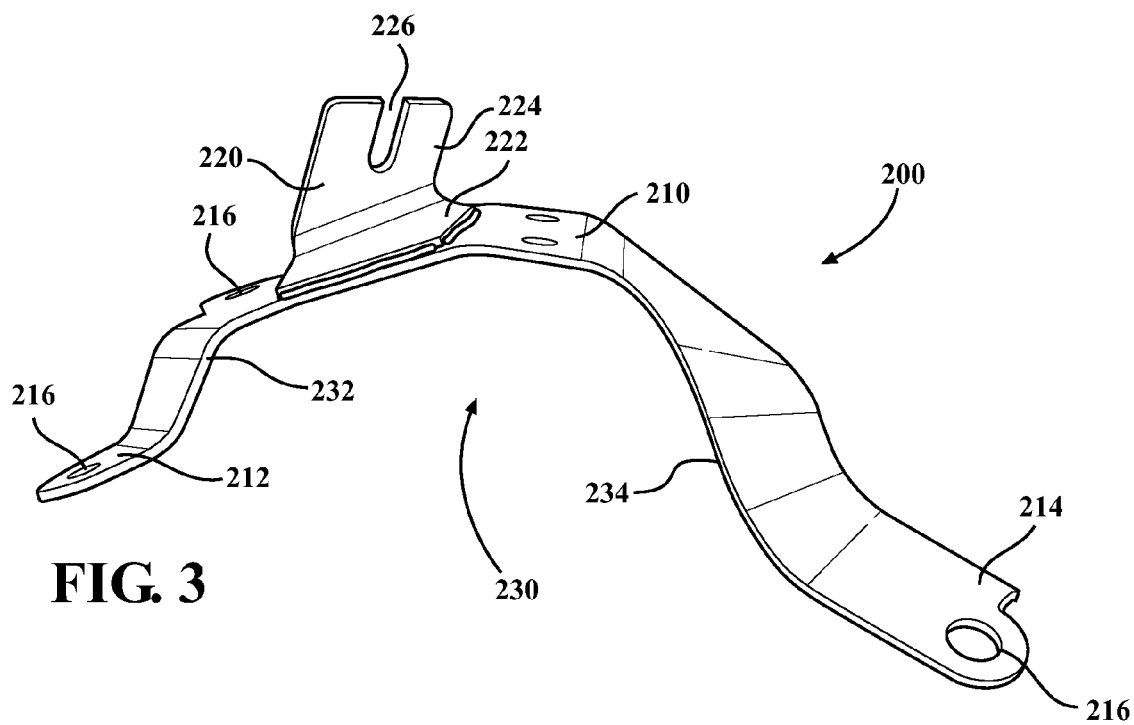
FIG. 3 is another view of the protector of FIG. 2.
Figure 4:
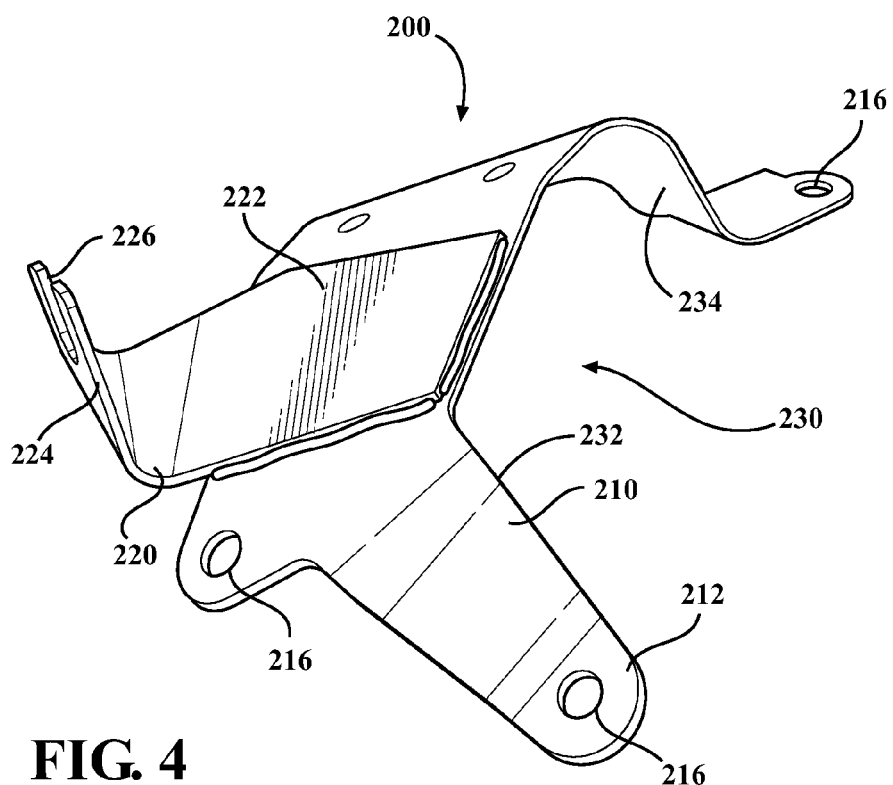
FIG. 4 is another view of the protector of FIG. 2.

Referring now to FIGS. 2-4, an example of a protector 200 for a vehicle engine system is shown. Some of the various possible elements of the exemplary protector 200 will now be described. It will be understood that it is not necessary for the protector 200 to have all of the elements shown in FIGS. 2-4 or described herein. The protector 200 can have any combination of the various elements shown in FIGS. 2-4. In one or more arrangements, the protector 200 can include one or more elements in addition to one or more of the various elements shown in the Figures.

In one or more arrangements, the protector 200 can be used in connection with a vehicle. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle can be a watercraft, an aircraft or any other form of motorized transport. In some implementations, arrangements described herein can be used in connection with non-motorized forms of transport. In some implementations, arrangements described herein can be used in one or more non-vehicular applications.

In one or more vehicular applications, the protector 200 can be used in connection with an engine system of the vehicle. The protector 200 can be part of, associated with, or operatively connected to one or more portions of an engine system. As used herein, the term "operatively connected" can include direct and indirect connections, including connections without direct physical contact. Furthermore, "operatively connected" can include unitary physical structures, that is, structures formed from a single piece of material (e.g. by casting, machining, three dimensional printing, etc.). The term "engine" or "engine system" can be used interchangeably and can include any system or apparatus capable of converting energy into useful mechanical motion to power a vehicle. For instance, an engine system can include internal combustion engines, fuel cells, or electric motors. As described with greater detail below, the engine system can include a transverse mounted V6 internal combustion engine.

As shown, the protector 200 can generally include a shield 210 and a support 220. In some embodiments, the shield 210 is configured to substantially cover at least a portion of one or more vehicle components. As used herein, the term "substantially cover," as used with the protector 200, shield 210, and/or support 220, includes any arrangements in which at least a portion of the shield 210 and/or the support 220 extends about at least a portion of a vehicle component in one or more directions. As used herein, the term "vehicle component" or "engine component" can be used interchangeably and include any component within a vehicle. For instance, vehicle components may include components operatively connected to any powertrain system, engine bay, electrical system, or fluid system.

Figure 5:
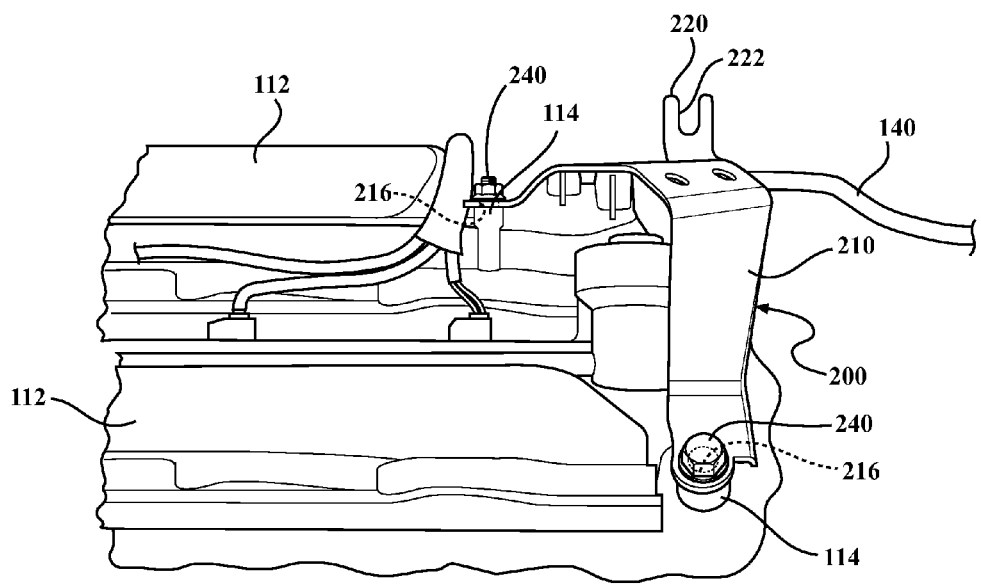
FIG. 5 is a view of a portion of an example engine system including the protector.
Figure 6:
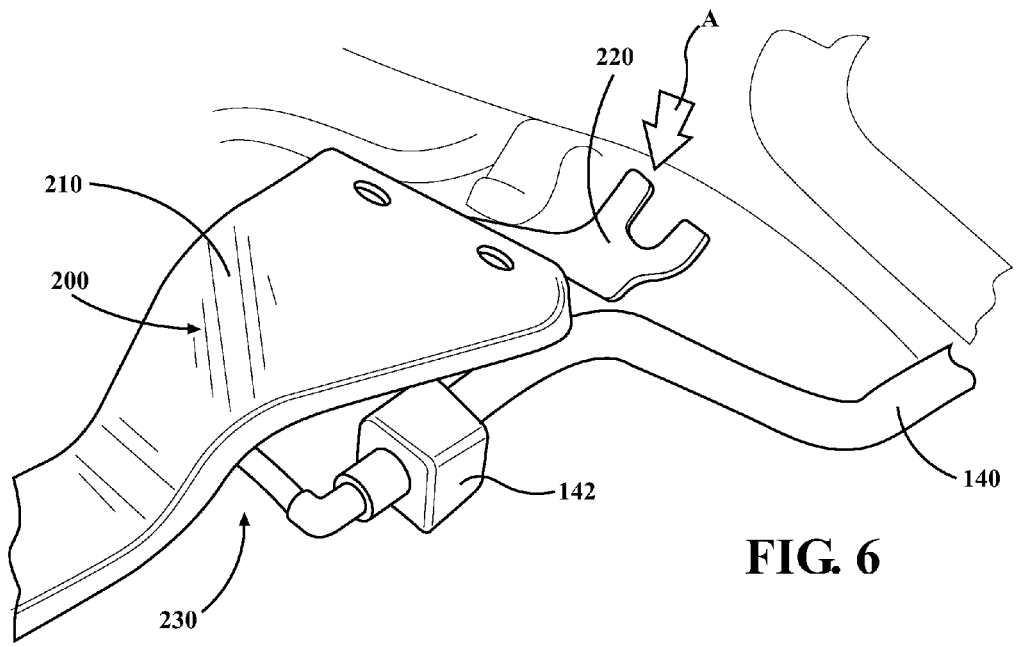
FIG. 6 is another view of a portion of an example engine system including the protector.

In one or more arrangements, the shield 210 can substantially cover an engine component that supplies fluid, electricity, and/or mechanical motion. As described with reference to FIGS. 5 and 6, the engine component can include one or more fuel delivery components. For instance, the fuel delivery component can be a fuel line 140 and/or fuel connector 142, as shown in FIG. 6. In other non-limiting examples, the engine component can be an electric input (e.g. wire harness), a drive shaft, and/or a coolant conduit, just to name a few possibilities.

The shield 210 can have any suitable configuration. For example, the shield 210 can, in one or more arrangements, form an arch. In such a configuration, the shield 210 can substantially cover one or more engine components. The shield 210 can be configured to allow the protector 200 to be operatively connected to a vehicle structure. To that end, the shield 210 can include one or more attachment features. In one or more arrangements, the shield 210 can include a plurality of mounting tabs. For instance, the shield 210 can include a first mounting tab 212 and a second mounting tab 214. As explained in further detail below, the first mounting tab 212 can be configured for attachment to a first portion of an engine assembly, and the second mounting tab 214 can be configured for attachment to a second portion of an engine assembly. For example, in one or more arrangements, the first mounting tab 212 can be attached to a first cylinder head of an engine and second mounting tab 214 can be attached to a second cylinder head of the engine.

The first and second mounting tabs 212, 214 can include one or more features to allow the protector 200 to be operatively connected to a vehicle structure. In one or more arrangements, the first and second mounting tabs 212, 214 can each include one or more apertures 216, 218, respectively. The apertures 216, 218 can be configured to receive and/or otherwise engage fasteners 240 (FIG. 5). For example, the first mounting tab 212 can include two apertures 216 defined therein. The second mounting tab 214 can have one aperture 216 defined therein. However, in one or more arrangements, any suitable number of apertures 216 can be present in the first or second mounting tabs 212, 214. Further, the mounting tabs 212, 214 can have any other suitable attachment features. In some non-limiting examples, the mounting tabs 212, 214 can be operatively connected to vehicle structure by one or more fasteners, one or more forms of mechanical engagement, one or more adhesives, one or more forms of welding, and/or one or more forms of brazing, just to name a few possibilities.

The mounting tabs 212, 214 of the protector 200 can be positioned and oriented based on desired attachment or mounting locations. For example, the first and second mounting tabs 212, 214 can extend such that apertures 216, 218 can be positioned as desired for engagement of fasteners 240 and operative connection to vehicle structure. In one or more arrangements, the protector 200 can be attached to a vehicle engine. More specifically, the first mounting tab 212 of the shield 210 can be attached to a first portion of the engine and the second mounting tab 214 can be attachable to a second portion of the engine.

In at least one example, the vehicle engine can be a transverse-mounted V6 engine. Thus, the engine can have two rows or banks of cylinders extending along a lateral direction of the vehicle. A first bank of cylinders can be oriented at an angle to a second bank of cylinders, substantially forming a generally V-shaped configuration. The first mounting tab 212 can be operatively connected to a first cylinder bank, and the second mounting tab 214 can be operatively connected to a second cylinder bank. Each of the mounting tabs 212, 214 can be attached to a cylinder head operatively connected to a cylinder bank.

In some arrangements, the mounting tabs 212, 214 can be positioned and oriented in any suitable manner relative to each other. The mounting tabs 212, 214 can be oriented to substantially match the size, shape, and/or contour of an attachment surface of the engine system. For example, the first mounting tab 212 can be shaped, oriented, and/or configured to contact a first portion of a first cylinder head. The second mounting tab 214 can be shaped, orientated, and/or configured to contact a portion of a second cylinder head. In some instances, portions of the first and second cylinder heads can be oriented at an angle relative to one another. Thus, the first mounting tab 212 can be angled relative to second mounting tab 214. For instance, the two mounting tabs 212, 214 can be angled downward and away from a center portion of shield 210. The apertures 216 may define an aperture axis that is approximately perpendicular to the location on mounting tabs 212, 214 where the aperture 216 is located. One or more aperture axes can be parallel to each other. Alternatively, two or more aperture axes can be angled relative to one another.

The shield 210 of the protector 200 can have any suitable size, shape, and/or configuration. The shield 210 can be positioned and/or operatively connected within an engine system in any suitable manner. For instance, the shield 210 can be shaped, sized, configured, positioned, and/or operatively connected within the engine system based on one or more factors, including, for example, safety, design, space, and/or material considerations or constraints. In one or more embodiments, the mounting tabs 212, 214 may define distal portions of the shield 210.

The shield can have any suitable configuration. In one or more arrangements, the shield 210 can be substantially planar. In one or more arrangements, the shield 210 can be non-planar, including one or more bends, curves, angles, twists, and/or steps. For example, the shield 210 can be shaped to form an arch or a curve. In such arrangements, the shield 210 a channel 230 can be defined by the shield 210. As used herein, "channel" can include any area proximate to an inside surface of an arched, curved, or bent shield 210. In one or more arrangements, the shield 210 can include a first wall 232 that extends to first mounting tab 212 and a second wall 234 that extends to the second mounting tab 214. Referring to FIG. 3, the first and second walls 232, 234 can extend at an angle with respect to each other and can form a portion of an arch. In one or more arrangements, a curved or arched shield 210 can allow the protector 200 to substantially cover an engine component at least partially positioned within or near the channel 230.

The shield 210 of the protector 200 can be made of any suitable material. For instance, the shield 210 can be made of one or more metals or polymers. In one or more arrangements, the shield 210 can have a substantially uniform thickness. In one or more arrangements, the shield 210 can have a non-uniform thickness. For instance, the thickness of the shield 210 can vary in one or more local areas or continuously in one or more directions (e.g. length and/or width). In one or more arrangements, the shield 210 can be of any suitable steel and can be from about 3 millimeters to about 8 millimeters thick. Additionally, the shield 210 can have any suitable cross-sectional shape. In one or more arrangements, the shield 210 can have a constant cross-sectional shape. In one or more arrangements, the shield 210 can have a varying cross-sectional shape along at least a portion of the protector 200. For example, the shield 210 can include thicker portions or structural elements (e.g. ribs) to increase the strength of the shield 210. The thicker portions or structural elements can be spaced along any desired direction.

In one or more arrangements, the protector 200 can include one or more supports 220. The support 220 can provide support to one or more vehicle components. As used herein, "to provide support" or "support" can include attaching to, contacting with, locating, positioning, and/or strengthening any vehicle component. In some embodiments, the support 220 can be configured to support one or more engine components. For instance, the support 220 can be configured to contact and provide support to an engine air intake component such as a throttle body.

One or more arrangements of the support 220 can be described with reference to FIGS. 2-4. The support 220 can extend away from the shield 210 toward one or more support ends 224. The support end 224 can be configured to operatively connect and/or to otherwise provide support to a vehicle component. In one or more arrangements, the support 220 can also include an overlap 222. The overlap 222 can extend along a portion of the shield 210.

In one or more arrangements, the support end 224 can include one or more attachment features. The attachment features can aid in the attachment, retention, or support of a vehicle component. For example, in one or more arrangements, the attachment feature of the support end 224 can be a slot 226. Some arrangements of the support end 224 can include other attachment features, including one or more apertures, fasteners, adhesives, locating pins, or other physical structure, just to name a few possibilities. In some embodiments, the slot 226 can be adapted to receive or engage at least a portion of a vehicle component. For example, the slot 226 can receive a fastener or pin of a vehicle component when that component is installed in its operational position in the vehicle. As mentioned, the vehicle component to be supported can be a throttle body, and the throttle body can have structure that extends through or otherwise engages slot 226.

The support end 224 can be shaped as desired for the support 220. In one or more arrangements, the support end 224 can be substantially flat or substantially planar. In one or more arrangements, the support end 224 can include one or more non-flat or non-planar features. As an example, the support end 224 can be oriented at an angle relative to other portions of the support 220, such as the overlap 222. The support end 224 can include one or more bends, steps, twists, ramps, and/or curves. For instance, the support end 224 can include a bend of approximately 90 degrees with respect to the overlap 222. As used herein, the term "approximately" includes exactly the term it modifies and slight variations therefrom. Thus, the term "approximately 90 degrees" means exactly 90 degrees and slight variations therefrom. In one or more arrangements, the support end 224 can include a bend at an obtuse angle or at an acute angle with respect to the overlap 222. The support end 224 can also be twisted at an angle relative to a direction that overlap 222 extends. The support end 224 can extend at any suitable angle relative to the shield 210. In one or more arrangements, the support end 224 may extend outward and beyond an edge of shield 210. For example, the support 220 may extend in a direction along a top surface of shield 210, past an outer edge, and extend upward to an angled support end 224.

The support 220 of the protector 200 can be made of any suitable material. For instance, the support 220 can be made of one or more metals or polymers. The support 220 can be made of the same material as the shield 210. Alternatively, the support 220 can be made of a different material than the shield 210.

The support 220 can have any suitable thickness. In one or more arrangements, the support 220 can have a substantially uniform thickness. In one or more arrangements, the support 220 can have a non-uniform thickness. For instance, the thickness of the support 220 can vary in one or more local areas or continuously in one or more directions (e.g. length and/or width). In one or more arrangements, the support 220 can be of any suitable steel and can be from about 3 millimeters to about 8 millimeters thick. Additionally, the support 220 can have any suitable cross-sectional shape. In one or more arrangements, the support 220 can have a constant cross-sectional shape. In one or more arrangements, the support 220 can have a varying cross-sectional shape along at least a portion of the protector 200.

For example, the support 220 can include thicker portions or structural elements (e.g. ribs) to increase the strength of the support 220. The thicker portions or structural elements can be spaced along any desired direction.

In one or more arrangements, the support 220 can be operatively connected to shield 210. For example, the support can be fixedly attached to shield 210. In some embodiments, the support 220 includes an overlap 222 that can be attached to shield 210. For instance, the overlap 222 can be welding to shield 210 at a weld joint 228 (FIG. 2). The overlap 222 can cover a portion of shield 210. The overlap 222 can directly contact the shield 210. The overlap can be substantially adjacent to the shield 210. Further, the overlap 222 can be operatively connected to the shield 210 in a variety of alternative ways, such as through one or more forms of mechanical engagement, one or more fasteners, one or more adhesives, one or more forms of welding, and/or one or more forms of brazing, to name a few possibilities.

In one or more arrangements, the support 220 and the shield 210 can be formed as a unitary structure. Thus, protector 200 can be one continuous physical structure including both the shield 210 and the support 220. In one or more arrangements, the protector 200 can be formed from one piece of metal. For instance, support 220 having shield 210 and support 220 can be formed by stamping one continuous piece of any suitable steel. Alternatively, the shield 210 and the support 220 can be formed as a unitary structure by casting and/or machining.

FIGS. 5 and 6 are views showing an example of the protector 200 being used in connection with an engine system. In one or more arrangements, the engine system can include an engine having two cylinder banks 112. For instance, the engine system can include a transverse mounted V6 internal combustion engine. The engine system can further include fuel delivery components. For example, the engine system can include a fuel line 140 and a fuel line connector 142. The cylinder bank 112 can include mounts 114 to allow a connection with the protector 200. In some embodiments, protector 200 can be operatively attached to each cylinder bank 112 via fasteners 240. For instance, two fasteners 240 can engage the two apertures 216 defined in the first mounting tab 212 of the shield 210. Further, one fastener 240 can engage one aperture 216 of the second mounting tab 214.

In one or more arrangements, the protector 200 can be configured such that shield 210 substantially covers at least a portion of one or more engine components. For example, the shield 210 can substantially cover a portion of the fuel line 140 and/or the fuel line connector 142. In some embodiments, the shield 210 can form an arch over the fuel line 140 and/or the fuel line connector 142. The fuel line 140 and/or the fuel line connector 142 can be located within the channel 230 formed by the arched shield 210.

With reference now to FIG. 6, one or more portions of protector 200 can be subject to forces or impacts. For example, the protector 200 can be subjects to one or more forces during vehicle collisions or accidents. In one or more arrangements, the support 220 of the protector 200 can be subjected to a force in the direction of arrow A. Some embodiments of the protector 200 having a unitary or operatively connected support 220 can resist or prevent relative movement of the support 220 with respect to the shield 210. This can be contrasted, for example, to a support bracket not operatively connected to the shield 210 that can deform, displace, or otherwise move relative to the shield 210.

A protector can be provided with a vehicle engine system in any suitable manner. For example, the protector 200 can have a shield 210 operatively connected to a support 220. The protector can be brought together with one or more portions of the engine system such that shield 210 can substantially cover at least one engine component. As used herein, the term "bringing together" or "brought together" means any movement, positioning, and/or manipulation of one or more components of the protector 200. For example, the protector 200 can be operatively connected to an engine system such that the shield 210 is attached to two portions of the engine system. For instance, a first mounting tab 212 of the shield 210 can be operatively connected to a first cylinder bank of an engine. The second mounting tab 214 of the shield 210 can be operatively connected to a second cylinder bank of the engine. The shield can be configured to substantially cover a fuel delivery component. Further, the protector 200 can be brought together with the engine system to allow the support 220 to support at least one vehicle component. For instance, the support 220 can be configured to be operatively connected to an engine air intake component such as a throttle body.

Methods can include other steps that are not shown here, and in fact, methods are not limited to including every step described. Furthermore, the steps detailed here as part of the method for providing a protector are not limited to this particular chronological order. Indeed, some of the steps can be performed in a different order than what is described and/or at least some of the steps can occur simultaneously.

It will be appreciated that arrangements described herein can provide numerous benefits, including one or more of the benefits mentioned herein. For example, arrangements described herein can increase the strength or rigidity of protectors positioned near one or more powertrain components. The protectors can reduce the part number and/or complexity within an engine system, and save weight or cost of the system. Further, such systems and protectors can eliminate attachment features and attachment areas within the system. The characteristics of the protector can prevent or reduce relative movement between a support and a shield. This can prevent or reduce the possibility of a support bracket contacting a protected engine component.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and can be used in combination with any other example, embodiment, implementation, aspect, feature, or element.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein can include sequences or series of steps or stages, elements of the methods disclosed herein can occur in various orders or concurrently. Additionally, elements of the methods disclosed herein can occur with other elements not explicitly presented and described herein. Furthermore, not all elements of the methods described herein can be required to implement a method in accordance with this disclosure. Although aspects, features, and elements are described herein in particular combinations, each aspect, feature, or element can be used independently or in various combinations with or without other aspects, features, and elements.

Although features can be described above or claimed as acting in certain combinations, one or more features of a combination can in some cases be excised from the combination, and the combination can be directed to a sub-combination or variation of a sub-combination.

The above-described aspects, examples, and implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A protector for a vehicle engine system, the protector comprising:
    a shield having a first mounting tab and a second mounting tab, the first mounting tab and the second mounting tab being angled relative to one another, the first mounting tab being configured for direct attachment to a first cylinder bank via a first fastener and the second mounting tab being configured for direct attachment to a second cylinder bank via a second fastener, and the shield forms an arched portion between the first mounting tab and the second mounting tab, the arched portion being configured to substantially cover an engine fuel delivery component below the shield, the arched portion of the shield defining a channel between an inside surface of the shield and an area proximate to said inside surface; and
    a support directly connected with the shield between the first mounting tab and the second mounting tab, the support having a support end with a slot, the slot being configured to connect with an engine air intake component above the shield, wherein the first mounting tab has a first connection surface configured on a first plane and the second mounting tab has a second connection surface configured on a second plane, and wherein the first plane forms an angle at an intersect with the second plane.

2. The protector of claim 1, wherein the engine fuel delivery component includes one of a fuel line and a fuel line connector.

3. The protector of claim 2, wherein the engine air intake component is a throttle body.

4. The protector of claim 1, wherein the support further includes an overlap portion that is attached to the shield.

5. The protector of claim 4, wherein the overlap portion is welded to the shield.

6. The protector of claim 4, wherein the support end is angled with respect to the overlap portion.

7. The protector of claim 1, wherein the support is formed as a unitary structure with the shield.

8. The protector of claim 1, wherein the first mounting tab includes two apertures defined therein and the second mounting tab includes one aperture defined therein.

9. The protector of claim 8, wherein the shield is configured to be attached using a plurality of bolts.

10. A vehicle engine system, comprising:
    an engine having a first cylinder bank and a second cylinder bank;
    a fuel line;
    a fuel connector in fluid communication with the fuel line and the engine;
    a throttle body; and
    a protector, the protector comprising:
        a shield having a first mounting tab and a second mounting tab, wherein the first mounting tab is connected in direct physical contact with the first cylinder bank and the second mounting tab is connected in direct physical contact with the second cylinder bank, and the shield forms an arched portion between the first mounting tab and the second mounting tab, the arched portion being configured to substantially cover a portion of the fuel line or the fuel connector below the shield, wherein the arched portion of the shield defines a channel between an inside surface of the shield and an area proximate to said inside surface, wherein the first mounting tab has a first connection surface configured on a first plane and the second mounting tab has a second connection surface configured on a second plane, and wherein the first plane forms an acute angle or obtuse angle at an intersect with the second plane; and
        a support operatively connected with the shield, the support having a support end with a slot, the slot being configured to connect with the throttle body above the shield.

11. The vehicle engine system of claim 10, wherein the support has a bend of approximately 90 degrees.

12. The vehicle engine system of claim 10, wherein the first mounting tab includes two apertures defined therein and the second mounting tab includes one aperture defined therein.

13. The vehicle engine system of claim 10, wherein the support has a bend of approximately 90 degrees.

14. The vehicle engine system of claim 10, wherein the first mounting tab includes two apertures defined therein and the second mounting tab includes one aperture defined therein.

* * * * *